United States Patent [19]

Kosugi et al.

[11] Patent Number: 4,697,772
[45] Date of Patent: Oct. 6, 1987

[54] UNIVERSAL HEAD FOR A TRIPOD

[75] Inventors: Yoshinobu Kosugi, Tokyo; Kaoru Tachibana, Sakado, both of Japan

[73] Assignee: Slik Tripod Co., Ltd., Saitama, Japan

[21] Appl. No.: 923,435

[22] Filed: Oct. 23, 1986

[30] Foreign Application Priority Data

Nov. 1, 1985 [JP] Japan .................... 60-169087
Nov. 13, 1985 [JP] Japan .................... 60-174664

[51] Int. Cl.$^4$ .................................... F16M 11/12
[52] U.S. Cl. ................................ 248/183; 248/278; 264/293; D16/46
[58] Field of Search ............ 248/183, 178, 179, 184, 248/185, 186, 278, 282, 284; D16/44, 45, 46, 47; 264/293, 294

[56] References Cited

U.S. PATENT DOCUMENTS

| 276,124 | 4/1883 | Wright | 248/186 X |
|---|---|---|---|
| 675,545 | 6/1901 | Hatch | 182/206 X |
| 1,397,931 | 11/1921 | Kurtz | 248/185 X |
| 2,651,338 | 9/1953 | Curtis | 248/289.1 X |
| 2,701,113 | 2/1955 | Koonter | 248/278 X |
| 2,939,364 | 6/1960 | Doswell et al. | 248/289.1 X |
| 4,451,020 | 5/1984 | Posso | 248/183 |

FOREIGN PATENT DOCUMENTS

| 2852034 | 7/1979 | Fed. Rep. of Germany | 248/183 |
|---|---|---|---|
| 60-38995 | 3/1985 | Japan. | |
| 60-75795 | 5/1985 | Japan. | |
| 60-37511 | 11/1985 | Japan. | |

Primary Examiner—Robert W. Gibson, Jr.
Assistant Examiner—David L. Talbott
Attorney, Agent, or Firm—Frishauf, Holtz, Goodman & Woodward

[57] ABSTRACT

A camera platform, which is mounted on a tilt member by means of a shaft, is allowed to rock around the shaft, between a horizontal position and a vertical position. A bracket of the platform can slide relatively to a support portion of the tilt member, in the axial direction of the shaft. First and second recesses are formed in an end face of the bracket. The support portion of the tilt member is formed with a projection, which is fitted alternatively in one of the recesses. When the platform is in its horizontal position, the projection is fitted in the first recess. When the platform is in its vertical position, the projection is fitted in the second recess. The projection can be disengaged from the first or second recess by only sliding the bracket of the camera platform in the axial direction of the shaft.

4 Claims, 14 Drawing Figures

UNIVERSAL HEAD FOR A TRIPOD

BACKGROUND OF THE INVENTION

The present invention relates to a universal head for a tripod, and more specifically to an improvement of a universal head capable of shifting a camera platform between horizontal and vertical positions.

A universal head for a tripod is attached to the top portion of the tripod. It is provided with a camera platform for supporting a camera. Conventional universal heads are disclosed, for example, in Japanese Utility Model Disclosure Nos. 60-38995 and 60-75795 and Japanese Utility Model Publication 60-37511.

These prior art universal heads comprise three major components, i.e., a pan member, a tilt member, and a camera platform. These components can move independently of one another. The pan member is rotatably mounted on a vertical first shaft, at the top portion of the tripod, and is provided with a horizontal second shaft. The tilt member is rotatably mounted on the second shaft. It has a horizontal third shaft, which extends at right angles to the second shaft. The camera platform is mounted on the third shaft for vertical rotation. The pan member, tilt member, and camera platform can be fixed in desired rotational positions, by clamp means such as screw members.

In the conventional universal heads described above, the camera platform can be brought down to a horizontal position or raised to a vertical position, with the tilt member kept fixed in place. Thus, when the platform is horizontal, the camera can be operated in its horizontal position, for photographing. When the platform is fixed in the vertical position, photographing can be effected with the camera in its vertical position.

However, the conventional universal heads have drawbacks. They need many components, and are complicated in structure. More specifically, they require the clamp means for fixing the camera platform at a desired angular position. In addition, it involves considerable labor to fix or unfix the platform. The reason is that such work requires the screw members of the clamp means to be tightened or loosened.

Also known are universal heads in which only the pan member and tilt member can be rotated, and, the camera platform is integral with the tilt member. Therefore, these heads need neither means for rotatably mounting the platform on the tilt member, nor means for clamping the platform. Thus, they are simple in construction, and require fewer components.

When using these universal heads, however, it takes much time to change the camera position. In shifting the camera position from the horizontal position to the vertical position, the tilt member must be rotated downward through 90°, after reorienting the camera on the camera platform by 90°, and then refixing the camera on the platform.

SUMMARY OF THE INVENTION

Accordingly, the object of the present invention is to provide a universal head for a tripod, having a simple construction and capable of easily shifting a camera between horizontal and vertical postures.

In order to achieve the above object of the present invention, there is provided a universal head, which comprises a pan member rotatably mounted on a vertical first shaft, and having a horizontal second shaft extending at right angles to the first shaft; a tilt member rotatably mounted on the second shaft, and provided with a third shaft extending at right angles to the second shaft; a camera platform including a bracket rotatably mounted on the third shaft; and stopper means adapted to lock the camera platform when the platform is held in its horizontal or vertical position.

According to the present invention, the position of the camera platform can be shifted between the horizontal and vertical positions, by a simple operation. Moreover, the platform has a simple construction, and requires fewer parts, thus permitting lower manufacturing costs.

DETAILED DESCRIPTION OF THE PREFERRED EMBODIMETS

Figure 1:
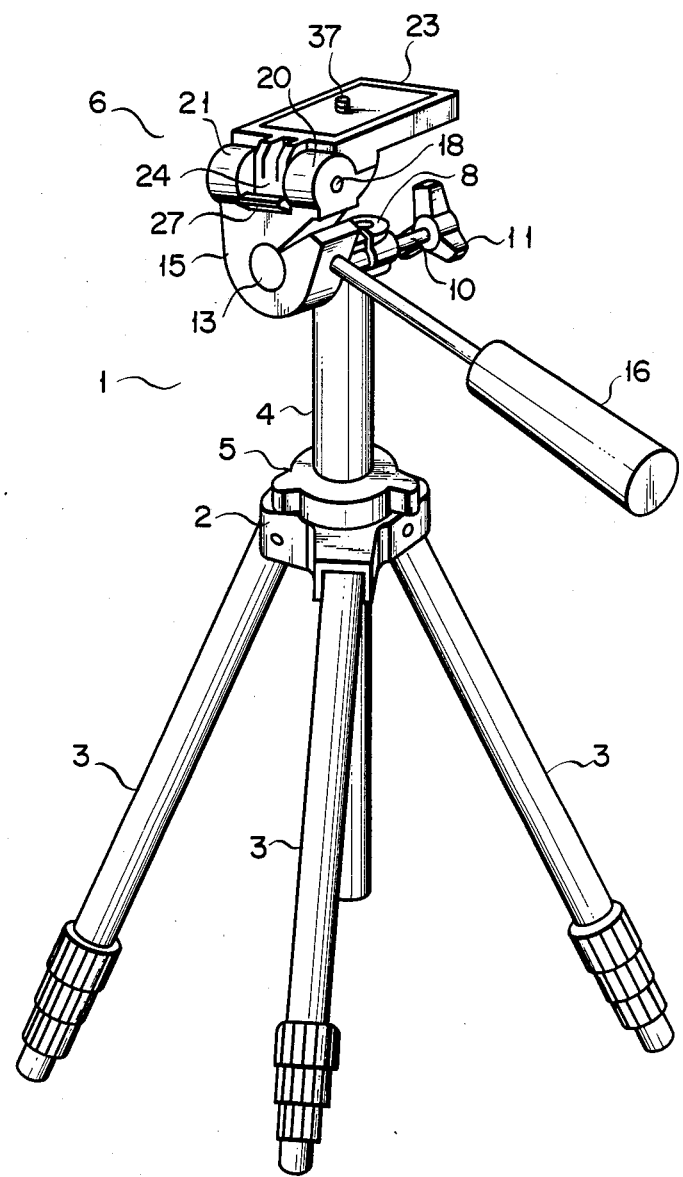
FIG. 1 is a perspective view showing a universal head and a tripod according to an embodiment of the present invention.

As shown in FIG. 1, tripod 1 has base 2. The respective upper ends of three legs 3 are rockably attached to base 2. Like those of the prior art tripods, legs 3 have a telescopic structure, each composed of a plurality of pipes connected to one another. Center post (first shaft) 4 is also attached to base 2. Shaft 4 can move up and down, relatively to base 2, and can be fixed by lock mechanism 5. These members may be constructed in the same manner as those of the prior art tripods.

Universal head 6, which is mounted on the top of first shaft 4, will now be described in detail.

Head 6 includes pan member 8, which is attached to the upper end of first shaft 4, for horizontal rotation. Clamp member 10 is screwed in member 8. If grip 11 of member 10 is turned clockwise, pan member 8 is fixed to shaft 4. If grip 11 is turned counterclockwise, clamp member 10 is released, thus allowing member 8 to rotate.

Pan member 8 is provided with horizontal second shaft 13. Tilt member 15 is mounted on shaft 13 for vertical rotation. It is fitted with rod 16. If rod 16 is turned clockwise, tilt member 15 is fixed to shaft 13. If rod 16 is turned counterclockwise, member 15 is allowed to rotate.

Tilt member 15 is provided with horizontal third shaft 18, which extends at right angles to second shaft 13. Shaft 18 is supported by a pair of support portions 20 and 21 of member 15.

Camera platform 23 is mounted on third shaft 18. It can rock vertically around shaft 18.

Figure 5:
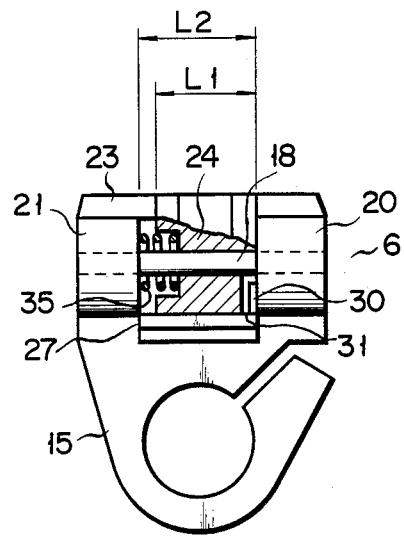
FIG. 5 is a partial front view of the universal head shown in FIG. 1.

Camera platform 23 includes bracket 24, which is interposed between support portions 20 and 21. Third shaft 18 penetrates bracket 24. As shown in FIG. 5, axial length L1 of bracket 24 is several millimeters shorter than distance L2 between portions 20 and 21. Thus, bracket 24 can move between portions 20 and 21, in the axial direction of shaft 18. Also, the bracket can rotate relatively to support portions 20 and 21, around third shaft 18.

Figure 7:
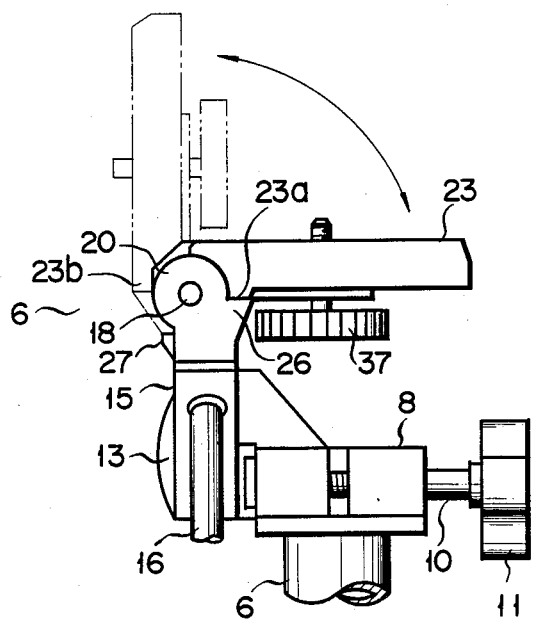
FIG. 7 is a side view of the universal head shown in FIG. 1.

Stoppers 26 and 27 are used to restrict the range of rocking motion of camera platform 23. Stopper 26 engages portion 23a of platform 23 when the platform takes its horizontal position, as shown in FIG. 7. Thus, platform 23 cannot descend below the horizontal position. Stopper 27 engages portion 23b of platform 23 when the platform takes its vertical position, as indicated by two-dot chain line in FIG. 7. Thus, platform 23 cannot rotate beyond the vertical position. In this manner, camera platform 23 can rock around third shaft 18, over the range from the horizontal position to the vertical position.

Figures 3, 4:
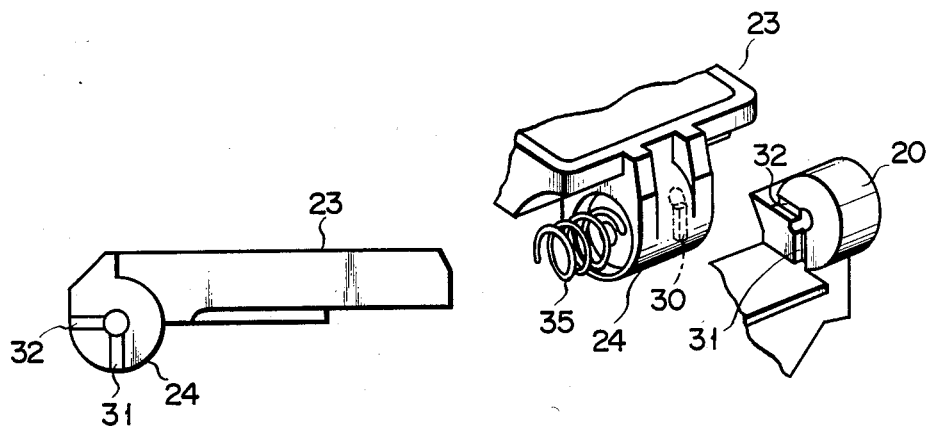
FIG. 3 is a side view of a camera platform of the universal head shown in FIG. 1.
FIG. 4 is a perspective view showing a modification of a combination of bracket and support portion.

Projection 30 is formed on the end face of support portion 20. First and second recesses 31 and 32 are formed in one end face of bracket 24. Alternatively, projection 30 may be formed on bracket 24, as shown in FIG. 4. In this case, recesses 31 and 32 are formed in portion 20.

First recess 31 is located in a position such that it engages projection 30 when camera platform 23 is brought down to the horizontal position. Second recess 32 is positioned at a phase angle of 90 degrees to recess 31. In other words, recess 32 is located in a position such that it engages projection 30 when platform 23 is raised to the vertical position. Projection 30 and recesses 31 and 32 constitute stopper means.

Figure 2:
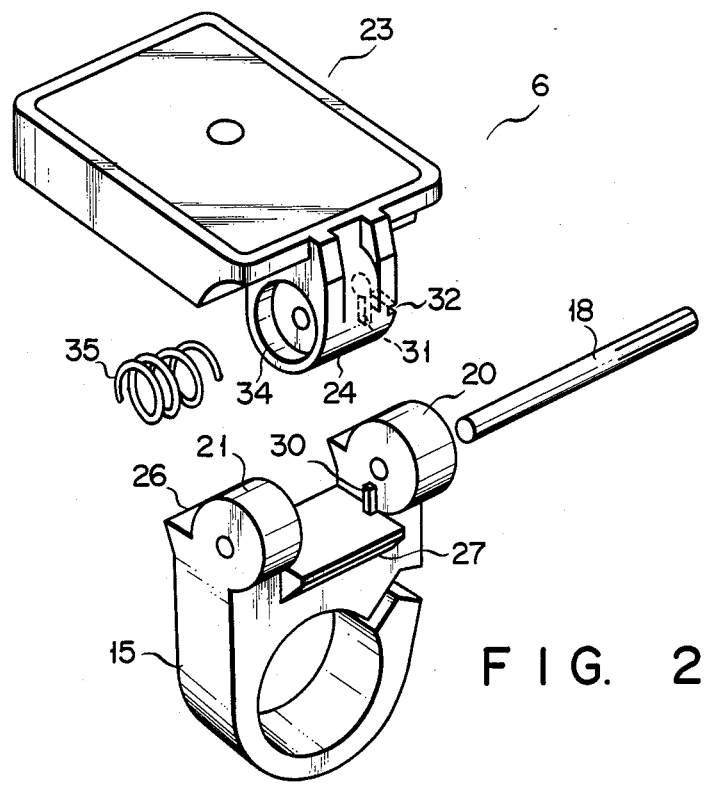
FIG. 2 is an exploded perspective view showing part of the universal head shown in FIG. 1.

As shown in FIG. 2, hollow 34 is formed in the other end face of bracket 24. Coil spring 35 is held between the wall of hollow 34 and support portion 21. Compressed between bracket 24 and portion 21, spring 35 urges the bracket toward support portion 20. Camera platform 23 is fitted with screw 37, which is used to support camera 40.

Figure 8:
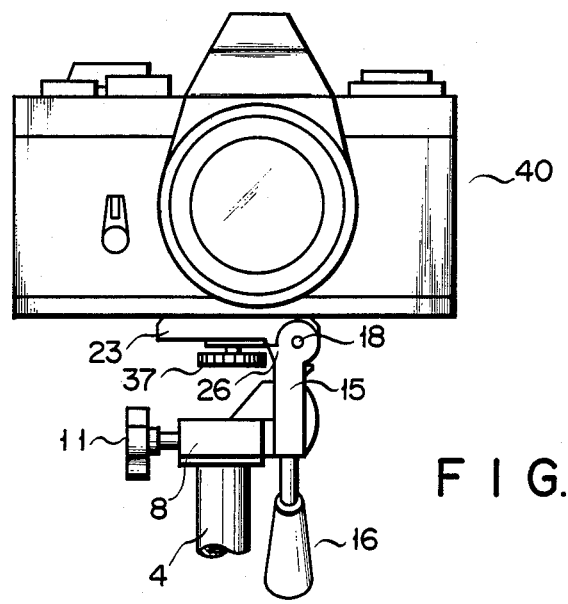
FIG. 8 is a front view showing a camera mounted in a horizontal position.

As shown in FIG. 8, camera 40 is mounted on camera platform 23. In this case, projection 30 is fitted in first recess 31, and bracket 24 is pressed by spring 35 so that projection 30 and recess 31 engage each other. By this, platform 23 is prevented from rocking unexpectedly. Thus, when platform 23 is kept horizontal, its load is supported by stopper 26.

Figure 6:
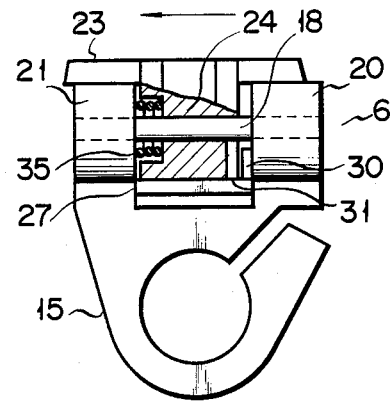
FIG. 6 is a partial front view of the universal head with its camera platform slid from the position shown in FIG. 5.
Figure 9:
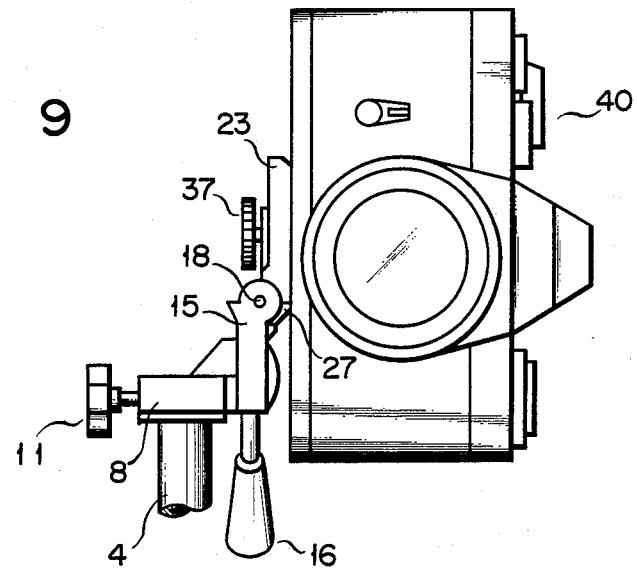
FIG. 9, is a front view showing the camera mounted in a vertical position.

In shifting the position of camera 40 to a vertical position, as shown in FIG. 9, camera platform 23 is first slid, as shown in FIG. 6. Then, projection 30 is disengaged from first recess 31. If platform 23 is then raised to its vertical position, projection 30 is fitted into second recess 32. In this manner, camera 40 is held in its vertical position. Also in this case, bracket 24 is pressed by spring 35 so that projection 30 and recess 32 engage each other. Accordingly, platform 23 is prevented from rocking unexpectedly. Thus, when platform 23 is kept vertical, its load is supported by stopper 27.

As described above, projection 30 is fitted alternatively in first or second recess 31 or 32. By doing this, the position of camera platform 23 can be shifted with ease.

Since camera platform 23 is fixed to tilt member 15 without using any screw or rod, the universal head of the present invention is simple in construction, requiring only a relatively small number of components.

Alternatively, an additional recess (not shown) may be provided between recesses 31 and 32. In this case, camera platform 23 can be fixed in an intermediate angular position between the horizontal and vertical positions.

Figure 10:
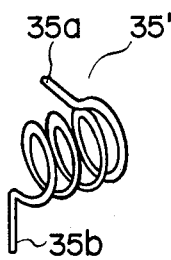
FIG. 10 is a perspective view showing a modification of a spring.

As shown in FIG. 10, torsion coil spring 35' may be used in place of spring 35. One end 35a of spring 35' is anchored to camera platform 23, while the other end is torsionally anchored to tilt member 15. Thus, spring 35' urges platform 23 to rise. With use of this arrangement, platform 23 rocks automatically toward its vertical position when projection 30 is disengaged from recess 31.

Figure 11:
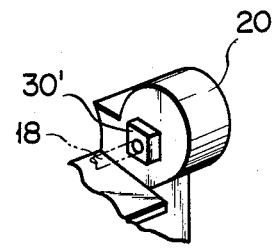
FIG. 11 is a perspective view showing a modification of a projection.

As shown in FIG. 11, moreover, square projection 30' may be used in place of projection 30. It is located so as to be penetrated by third shaft 18. Recess 31, adapted to engage projection 30', is formed in the end face of bracket 24. Recess 31 is square in shape so that it can engage projection 30' when camera platform 23 is in its horizontal or vertical position.

Figure 12:
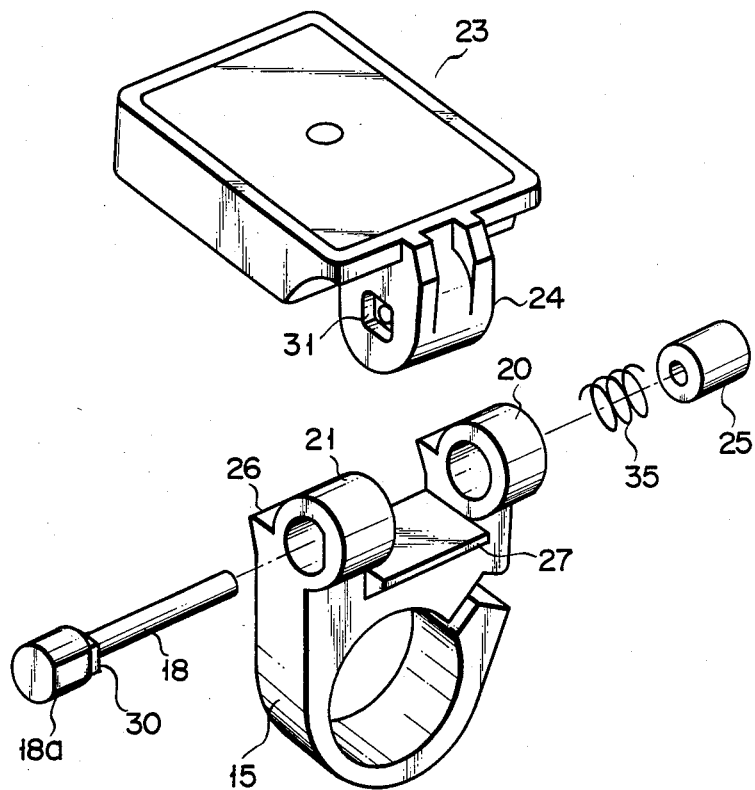
FIG. 12 is an exploded perspective view showing a universal head according to another embodiment of the invention.
Figure 13:
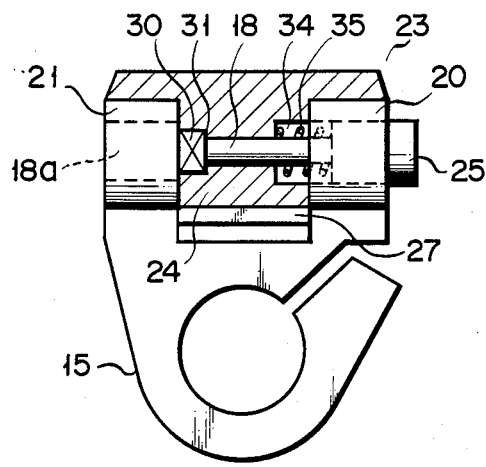
FIG. 13 is a front view, partially in section, showing the universal head of FIG. 12.
Figure 14:
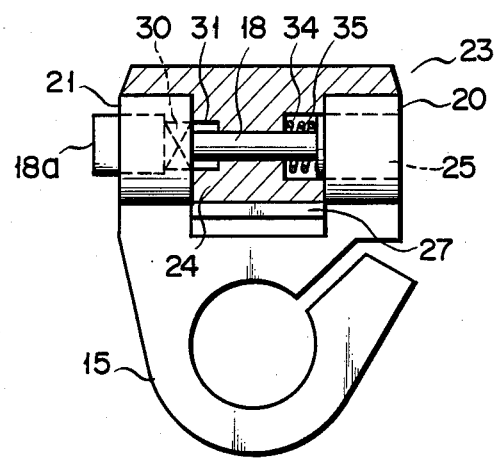
FIG. 14 is a front view of the universal head with its operating member moved from the position shown in FIG. 13.

FIGS. 12 to 14 show another embodiment of the present invention. This embodiment shares a fundamental construction with the first embodiment. In these drawings, therefore, like reference numerals refer to like portions as described in connection with the first embodiment.

In the second embodiment, third shaft 18 is movable relatively to bracket 24 and support portions 20 and 21, in its axial direction. Moreover, it has slide member 18a on one end thereof. Member 18a is fitted in support portion 21 in a nonrotatable manner. Operating member 25 is mounted on the other end of shaft 18.

Projection 30 is formed on part of third shaft 18. It has a square cross section.

Recess 31 is formed in one end face of bracket 24. It has a size such that projection 30 can be fitted therein. As viewed from its end-face side, recess 31 is square in shape. Thus, projection 30 and recess 31 can engage each other when camera platform 23 is made horizontal. If platform 23 is rotated through 90 degrees to the vertical position, projection 30 and recess 31 also engage each other. Arranged in this manner, projection 30 and recess 31 constitute stopper means.

As shown in FIG. 13, hollow 34 is formed in the other end face of bracket 24. Coil spring 35 is held between hollow 34 and operating member 25. Compressed between bracket 24 and support portion 20, spring 35 urges third shaft 18 toward portion 20. Member 25 projects from the side face of support portion 20.

In universal head 6, constructed in this manner, camera platform 23 is fixed as projection 30 and recess 31 engage each other when platform 23 is brought down to its horizontal position. In this state, the camera is held in its horizontal position.

If operating member 25 is depressed by a finger, slide member 18a moves in the manner shown in FIG. 14.

Thereupon, projection 30 is disengaged from recess 31. If camera platform 23 is rocked through 90 degrees to be raised, projection 30 engages recess 31 again. Thus, platform 23 is held in its vertical position.

What is claimed is:

1. A universal head for a tripod comprising:
   a vertical first shaft at an upper portion of the tripod;
   a pan member rotatably mounted on the first shaft, and having a horizontal second shaft extending at a right angle to the first shaft;
   a tilt member rotatably mounted on the second shaft, the tilt member including: (a) a pair of support lugs which are horizontally spaced from each other and are, respectively, provided with a pair of opposing faces, and (b) a third shaft extending horizontally at a right angle to the second shaft and secured to said pair of support lugs;
   a projection provided on one of the pair of opposing faces of the support lugs;
   a camera platform including a surface on which a camera is mounted and a bottom surface, and a bracket located between the support lugs and rotatably mounted on the third shaft, said bracket having a pair of end faces the distance between which is shorter than the distance between the pair of opposing faces of the support lugs so that said bracket is movable in the axial direction of the third shaft between the pair of opposing faces of the support lugs and is rotatable with reference to the support lugs about the third shaft as a center of rotation, one of said pair of end faces of the bracket being provided with a first recess and a second recess, said first recess receives the projection when the camera platform is lowered to a horizontal position, and when said bracket is at said one of the pair of opposing faces of the support lugs, and said second recess is positioned at an angle of 90 degrees to the first recess and receives the projection when the camera platform is raised to a vertical position and when said bracket is at said one of the pair of opposing faces of the support lugs;
   resilient means, held between the other end face of the bracket and the opposing face of the other support lug for urging the bracket toward said one of the opposing faces of the support lugs; and
   a stopper means for horizontally supporting the camera platform by engaging the camera platform when the camera platform is lowered to the horizontal position.

2. A universal head for a tripod according to claim 1, wherein the stopper means includes a stopper face projecting horizontally from the support lugs, the stopper face being in engagement with the bottom surface of the camera platform when the camera platform is at the horizontal position.

3. A universal head for a tripod according to claim 1, further comprising a second stopper means for vertically supporting the camera platform and having a stopper face horizontally projected from the tilt member, the stopper face engaging the camera platform when the camera platform is at the vertical position.

4. A universal head for a tripod according to claim 1, wherein the coil spring is a torsion coil spring means for urging the camera platform toward the vertical position.

* * * * *

UNITED STATES PATENT AND TRADEMARK OFFICE
CERTIFICATE OF CORRECTION

PATENT NO. : 4,697,772
DATED : Oct. 6, 1987
INVENTOR(S) : KOSUGI et al

It is certified that error appears in the above-identified patent and that said Letters Patent is hereby corrected as shown below:

Title page, left-hand column, under Foreign Application Priority Data, "60-169087" should be -- 60-169087(U) --; "60-174664" should be -- 60-174664(U) --.

Signed and Sealed this

Twelfth Day of April, 1988

Attest:

DONALD J. QUIGG

*Attesting Officer*        *Commissioner of Patents and Trademarks*